(12) United States Patent
Alameh et al.

(10) Patent No.: US 8,753,128 B2
(45) Date of Patent: Jun. 17, 2014

(54) METHOD AND APPARATUS FOR COUPLING PORTABLE COMMUNICATION DEVICES

(75) Inventors: Rachid Alameh, Crystal Lake, IL (US); Thomas Gitzinger, Libertyville, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 159 days.

(21) Appl. No.: 13/077,259

(22) Filed: Mar. 31, 2011

(65) Prior Publication Data
US 2012/0252230 A1  Oct. 4, 2012

(51) Int. Cl.
*H01R 39/00* (2006.01)
(52) U.S. Cl.
USPC .............................. 439/31; 439/165; 439/640
(58) Field of Classification Search
USPC ............................. 439/31, 165, 640, 534, 173
See application file for complete search history.

(56) References Cited

U.S. PATENT DOCUMENTS

| | | | |
|---|---|---|---|
| 4,039,805 A | | 8/1977 | Newell |
| 5,007,134 A | | 4/1991 | Stanford |
| 5,177,784 A | | 1/1993 | Hu et al. |
| 5,681,176 A | * | 10/1997 | Ibaraki et al. ........ 439/165 |
| 5,796,822 A | | 8/1998 | Larson et al. |
| 5,995,373 A | * | 11/1999 | Nagai ................. 361/755 |
| D430,153 S | | 8/2000 | Hino |
| D430,559 S | | 9/2000 | Hino |
| 6,229,964 B1 | | 5/2001 | Bell |
| 6,567,677 B1 | | 5/2003 | Sokoloff |
| 6,658,268 B1 | | 12/2003 | Bodnar et al. |
| 6,722,892 B1 | * | 4/2004 | Blakelock ............ 439/31 |
| 6,758,303 B2 | | 7/2004 | Zurek et al. |
| 6,768,523 B2 | | 7/2004 | Cheng |
| 6,786,734 B2 | * | 9/2004 | Yu ....................... 439/11 |

(Continued)

FOREIGN PATENT DOCUMENTS

| | | |
|---|---|---|
| GB | 2364613 A | 1/2002 |
| GB | 2469169 A | 10/2010 |

(Continued)

OTHER PUBLICATIONS

Patent Cooperation Treaty, International Search Report and Written Opinion of the International Searching Authority for International Application No. PCT/US2012/028173, May 29, 2012, 12 pages.

(Continued)

*Primary Examiner* — Hae Moon Hyeon

(57) ABSTRACT

A method and apparatus couple portable communication devices. The apparatus (100) can include a coupling mechanism (130) including a first coupling mechanism connector (131) and a second coupling mechanism connector (132) mechanically coupled to the first coupling mechanism connector. The second coupling mechanism connector can be movable relative to the first coupling mechanism connector. The apparatus can include a first portable communication device (110) including a first portable communication device connector (112) detachably coupled to the first coupling mechanism connector. The apparatus can include a second portable communication device (120) including a second portable communication device connector (122) detachably coupled to the second coupling mechanism connector. The second portable communication device can be configured to communicate with the first portable communication device and move relative to the first portable communication device when coupled to the coupling mechanism. The first portable communication device can be adapted to be used independent from the second portable communication device.

25 Claims, 12 Drawing Sheets

(56) References Cited

U.S. PATENT DOCUMENTS

| | | | |
|---|---|---|---|
| 6,839,576 B2 * | 1/2005 | Aagaard et al. | 455/575.1 |
| 6,990,711 B2 | 1/2006 | Koshikawa et al. | |
| 6,991,467 B1 * | 1/2006 | Cheng et al. | 439/10 |
| 7,027,797 B2 | 4/2006 | Mori | |
| 7,027,845 B2 | 4/2006 | Sudo | |
| 7,128,615 B1 * | 10/2006 | Liao | 439/640 |
| 7,151,912 B1 | 12/2006 | Morrison | |
| 7,351,065 B1 | 4/2008 | Merrell et al. | |
| 7,766,660 B1 * | 8/2010 | Chang | 439/11 |
| 7,805,171 B2 | 9/2010 | Alameh et al. | |
| 7,855,878 B2 | 12/2010 | Alameh et al. | |
| 8,157,574 B2 * | 4/2012 | Hsiao | 439/131 |
| 2002/0111186 A1 | 8/2002 | Cheng et al. | |
| 2004/0203507 A1 | 10/2004 | Newman et al. | |
| 2005/0041048 A1 | 2/2005 | Hillman et al. | |
| 2008/0167080 A1 | 7/2008 | Su | |

FOREIGN PATENT DOCUMENTS

| | | |
|---|---|---|
| JP | 04153297 B2 | 3/2004 |
| WO | 2009033827 A1 | 3/2009 |
| WO | 2009152335 A9 | 12/2009 |

OTHER PUBLICATIONS brass binnacle.com, Fine Nautical Gifts, Decor, Instruments and much more; Nickel Plated Brass Magnifying Glass on Stand; Jul. 14, 2010.

Joas Electronics Co., Ltd.; http://joas-elec.co.kr/eng/product.php?gno=62&category=001000000&oper=view&PHP; Shavers Product; Mar. 29, 2011.

Thomasnet News, "Slip Joints/Weld-on Hinges suit removable door applications." Internet download: http://news.thomasnet.com/fullstory/Slip-Joints-Weld-On-Hinges-suit-removable-door-applications-566520, Downloaded Jul. 14, 2010, 1 page.

Southco, "Removable Lift-Off Hinges" Internet download: http://www.southco.com/class/96-removable-lift-off-hinges-7633.html, Downloaded Jul. 14, 2010, 1 page.

Cens.com "Product Information—Concealed, Removable Hinge" Interned download: http://cens.com/cens/htnnl/en/product/product_main_88550.html, Downloaded Jul. 14, 2010, 2 pages.

* cited by examiner

METHOD AND APPARATUS FOR COUPLING PORTABLE COMMUNICATION DEVICES

BACKGROUND

1. Field

The present disclosure is directed to a method and apparatus for mechanically coupling portable communication devices. More particularly, the present disclosure is directed to a detachable coupling mechanism that provides fully configurable portable communication device form factors.

2. Introduction

Portable communication devices used in today's society include mobile phones, personal digital assistants, laptop computers, tablets, gaming devices, and various other electronic communication devices. Current portable communication devices are crammed with many features, such as phone features, gaming features, navigation features, music playing features, electronic messaging features, camera features, video features, application features, and many other features.

Unfortunately, because each feature uses a different user interface, compromises must be made to provide a compact user interface that is used to operate all of the features. This results in a non-optimum user interface. For example, the compromises are made with respect to portable communication device form factors, functionality, performance, overall usability, high redesign costs, and user costs. As an example of the user cost compromise, users must pay for features that they may never use, but that are already integrated into a portable communication device.

These compromises are made because a portable communication device is a singular device to keep the device portable and such a device cannot be mechanically combined with other portable communication devices. Thus, there is a need for a method and apparatus for mechanically coupling portable communication devices.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

A method and apparatus that couples portable communication devices are disclosed. The apparatus can include a coupling mechanism including a first coupling mechanism connector and a second coupling mechanism connector mechanically coupled to the first coupling mechanism connector. The second coupling mechanism connector can be movable relative to the first coupling mechanism connector. The apparatus can include a first portable communication device including a first portable communication device connector. The first portable communication device connector can be detachably coupled to the first coupling mechanism connector. The apparatus can include a second portable communication device including a second portable communication device connector. The second portable communication device connector can be detachably coupled to the second coupling mechanism connector. The second portable communication device can be configured to communicate with the first portable communication device and move relative to the first portable communication device when coupled to the coupling mechanism. The first portable communication device can be adapted to be used independent from the second portable communication device.

Figure 1:
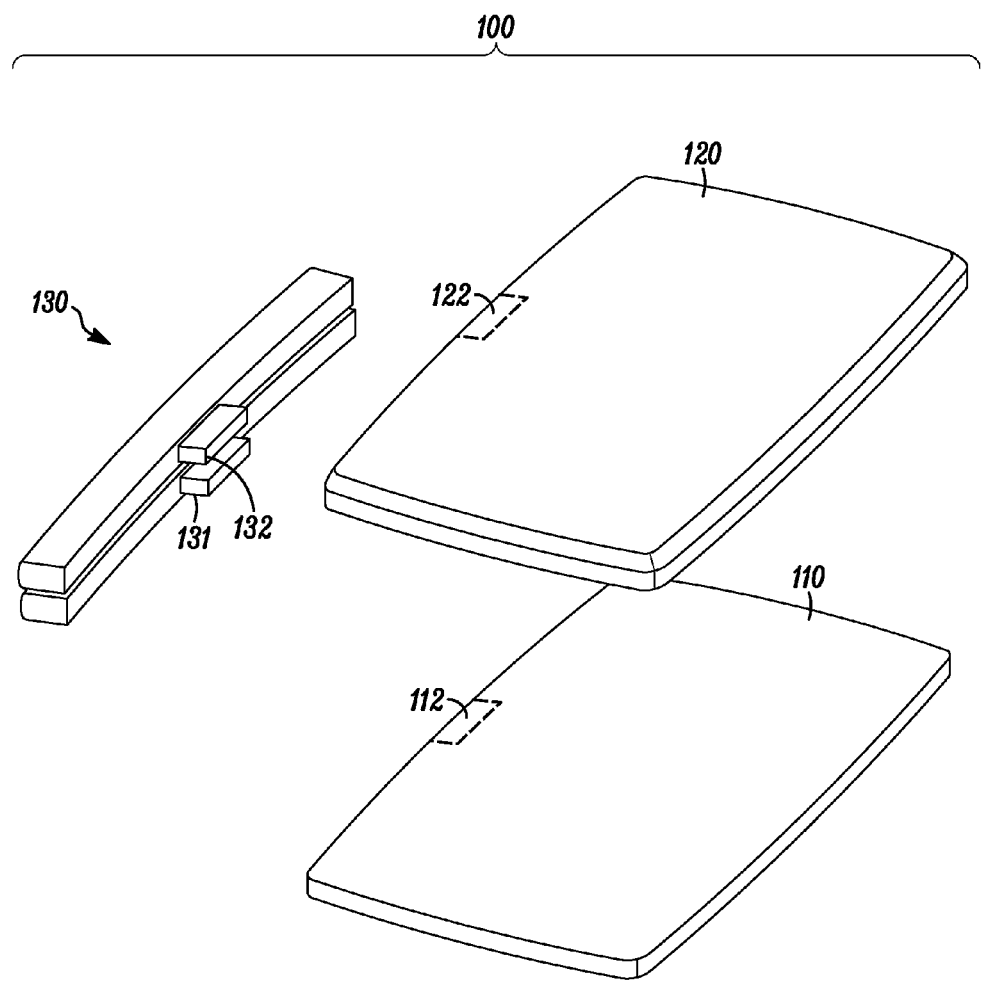
FIG. 1 is an example illustration of an apparatus according to one embodiment.

FIG. 1 is an example illustration of an apparatus 100 according to one embodiment. The apparatus 100 can include a coupling mechanism 130. The coupling mechanism 130 can be a hinge mechanism, a slider mechanism, a rotation mechanism, or any other coupling mechanism. For example, the coupling mechanism 130 can allow two portable communication devices to rotate or slide relative to each other. The coupling mechanism 130 can include a first coupling mechanism connector 131 and a second coupling mechanism connector 132 mechanically coupled to the first coupling mechanism connector 131. The second coupling mechanism connector 132 can be movable relative to the first coupling mechanism connector 131. The second coupling mechanism connector 132 can be mechanically movably coupled to the first coupling mechanism connector 131 so that the second coupling mechanism connector 132 is configured to move in a substantially single plane relative to the first coupling mechanism connector 131, such as by being rotatably coupled or slidably coupled to the first coupling mechanism connector 131.

The apparatus 100 can include a first portable communication device 110 including a first portable communication device connector 112 detachably coupled to the first coupling mechanism connector 131. In the illustration, the first portable communication device connector 112 is detached from the first coupling mechanism connector 131. "Detachable," "detachably coupled," and the like are defined as allowing a user to easily detach a portable communication device from a coupling mechanism connector. For example, detachable coupling mechanisms can allow a user to connect and disconnect devices without the use of tools. A coupling mechanism connector can include a male or female connector.

The first portable communication device 110 can be a device including cellular or wireless communication circuitry, such as Bluetooth, Wi-Fi, or GPS. For example, the first portable communication device 110 can be a mobile phone, a personal digital assistant, or any other communication device that is intended to be carried by a user while allowing the user to communicate or perform applications using the portable communication device 110. As a further example, the portable communication device 110 can be a wireless communication device, such as navigation device, gaming device, entertainment device, a wireless telephone, a cellular telephone, a personal digital assistant, a pager, a selective call receiver, or any other device that is capable of sending and receiving communication signals on an electronic network.

The apparatus 100 can include a second portable communication device 120 including a second portable communication device connector 122 detachably coupled to the second coupling mechanism connector 132. The second portable communication device 120 can be configured to communicate with the first portable communication device 110 and move relative to the first portable communication device 110 when coupled to the coupling mechanism 130. The first portable communication device 110 can be adapted to be used independent from the second portable communication device 120. For example, the first portable communication device 110 can include a battery, a display, a processor, and a user interface that provide for autonomous use of the first portable communication device 110. The second portable communication device 120 can be intended to be separated from the first portable communication device 110 via the coupling mechanism 130. That is the coupling mechanism 130 can provide a detachable function that enables the first and second portable communication devices to be separable at the user's discretion.

The second portable communication device 120 can provide additional functionality for the first portable communication device 110 when connected to the first portable communication device 110 via the coupling mechanism 130. For example, the second portable communication device 120 can provide extra memory, additional processing power, sensors, wireless capability, and/or other functionality for the first portable communication device 110. As another example, the second portable communication device 120 can enable different multiple access technology, such as CDMA, GSM, GPS, LTE, WiMax, or other multiple access technology for the first portable communication device 110.

The second portable communication device 120 can also enable latent functionality of the first portable communication device 110 when connected to the first portable communication 110 device via the coupling mechanism 130. For example, the second portable communication device 120 can provide a user interface for the first portable communication device 110 to access functions of the first portable communication device 110 that are not accessible without the second portable communication device 120. As a further example, the second portable communication device 120 can be a portable communication device user interface. Thus, the coupling mechanism 130 can enable operation of the first portable communication device with different attachable and portable communication device user interfaces.

The second portable communication device 120 can include components that use resources of the first portable communication device 110 when connected to the first portable communication device 110 via the coupling mechanism 130. For example, the second portable communication device 120 can be powered by the first portable communication device 110 when connected to the first portable communication device 110 via the coupling mechanism 130. The second portable communication device 120 can also have an independent power source.

The first portable communication device 110 can include a first portable communication device communication signal interface (not shown). The second portable communication device 120 can include a second portable communication device signal interface (not shown) configured to directly communicate with the first portable communication device communication signal interface using wireless communication. For example, the second portable communication device signal interface can directly communicate with the first portable communication device communication signal interface using a short range wireless radio connection, a Bluetooth connection, or any other wireless connection for communicating between at least two local devices.

Embodiments can provide for a coupling mechanism, such as a detachable hinge, such as the coupling mechanism 130. The coupling mechanism can provide for the ability to configure a portable communication device in a simple and effortless manner for a desired use, such as a slider, a clam, a rotator, television modes, and other uses. The coupling mechanism can provide for the ability to expand functionality based on user preferences, such as gaming, dialing, medical, music, military coordination, emergency services, entertainment, navigation, and other preferences. The coupling mechanism can provide for the ability to only pay for features of interest by providing additional features on a second portable communication device that is coupled to the first portable communication device. The coupling mechanism can provide for the ability to easily tailor a portable communication device based on medical needs and personal preferences, such as vision, hearing, and other medical needs and preferences. The coupling mechanism can provide for the addition of new functionality with minimum redesign cost.

Embodiments can provide for the second portable communication device to be a user interface card. A user interface card can provide options and functionality, such as a reading pad including touch screen, memory, a wireless interface, and a battery; GPS and sport navigation devices; SMS/pager devices; a cover for a main device that offers many colors, styles, and textures; a 3D-lens that overlaps with a main screen; MP3/FM radio devices; extended life battery devices; key fob access card and RF tag devices; second SIM card, world phone, SD, memory, PCMCIA, and gaming devices; remote control, mouse functionality, and off-glass gesturing devices; medical devices including prescription reminders and heart/blood/pressure monitoring devices; blood monitoring, air sampling (e.g., pollution, airborne radiation), loudspeaker, acoustic amplifier, and compartment devices; microprocessor card devices that use a portable communication device to wirelessly control microprocessor cards; and other options and functionality.

Embodiments can provide for a detachable hinge that mates electrically and mechanically with two phone sides to achieve various mechanical and electrical functionality; a detachable hinge that enables slider functionality; a detachable hinge that enables open book functionality; a detachable hinge that enables 360 degree rotation functionality; a detachable hinge that enables chopper like rotation functionality; a detachable hinge that interconnects two phone sides via hardwired interface; a detachable hinge that interconnects two phone sides via wireless interface; a detachable hinge that interconnects two phone sides through a USB connector; a detachable hinge that interconnects two phone sides through angle encoded headset type jack connector/door hinge topology; and other detachable hinge functionality.

Figure 2:
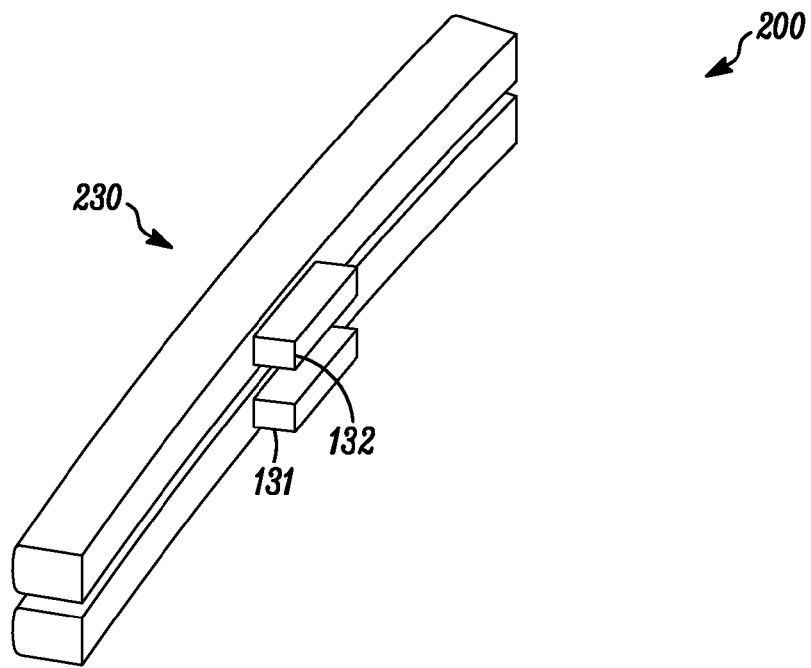
FIG. 2 is an example illustration of a coupling mechanism in one orientation according to one embodiment.
Figure 3:
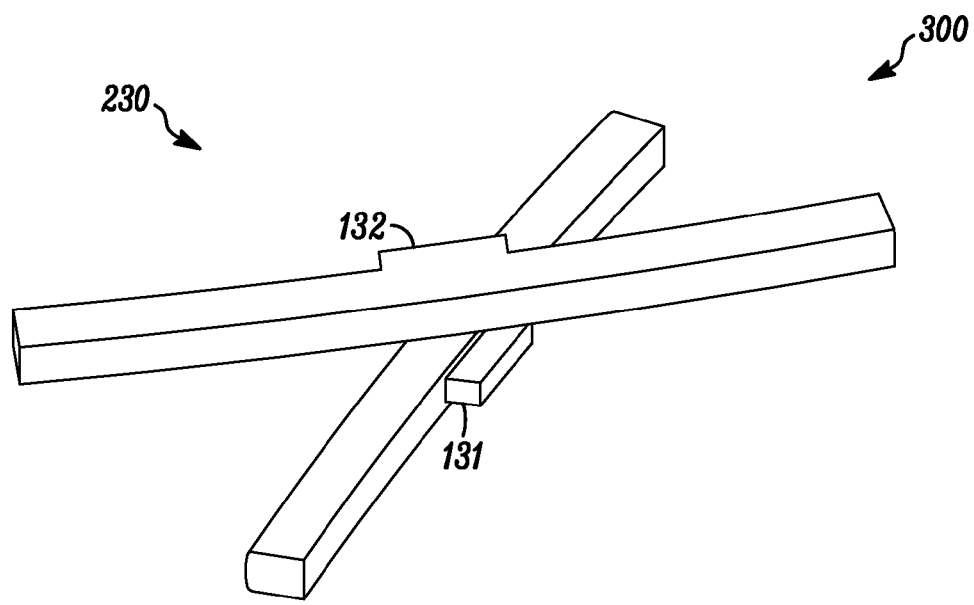
FIG. 3 is an example illustration of the coupling mechanism in FIG. 2 in a second orientation according to one embodiment.

FIG. 2 is an example illustration of a coupling mechanism 230, such as the coupling mechanism 130, in a first orientation 200 according to one embodiment. FIG. 3 is an example illustration of the coupling mechanism 230 in a second orientation 300 according to one embodiment. The coupling mechanism 230 can include the first coupling mechanism connector 131 and the second coupling mechanism connector 132 mechanically coupled to the first coupling mechanism connector 131. The coupling mechanism 230 can be a rotator and/or chopper coupling mechanism that can operate in one orientation, such as the orientation 200, and can operate at or move through another orientation, such as the second orientation 300. For example, the coupling mechanism 230 can rotate less than, at least, or more than 360 degrees.

Figure 4:
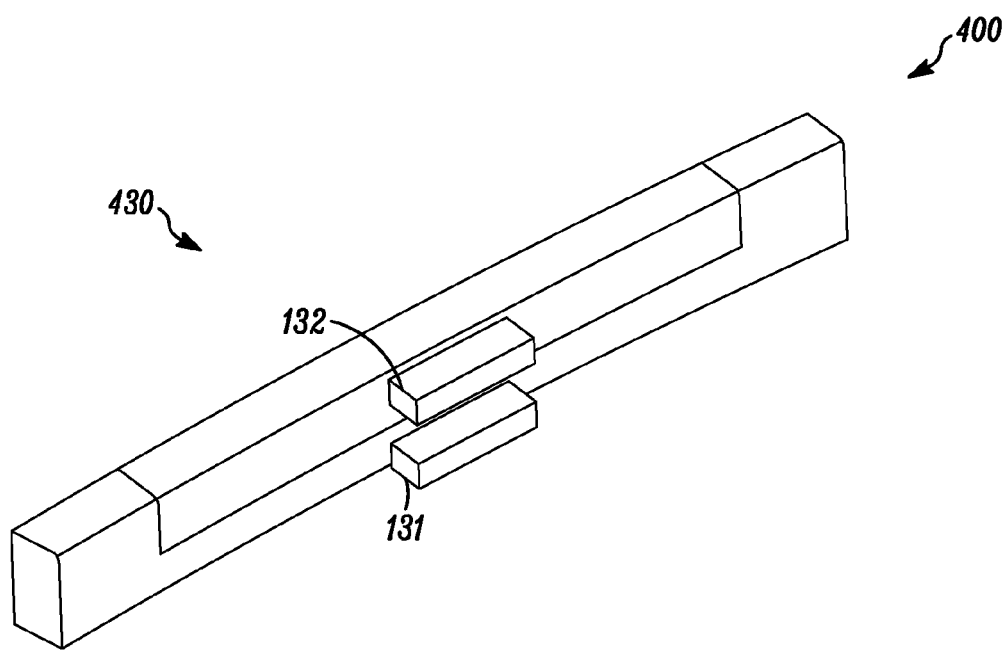
FIG. 4 is an example illustration of a coupling mechanism in one orientation according to one embodiment.
Figure 5:
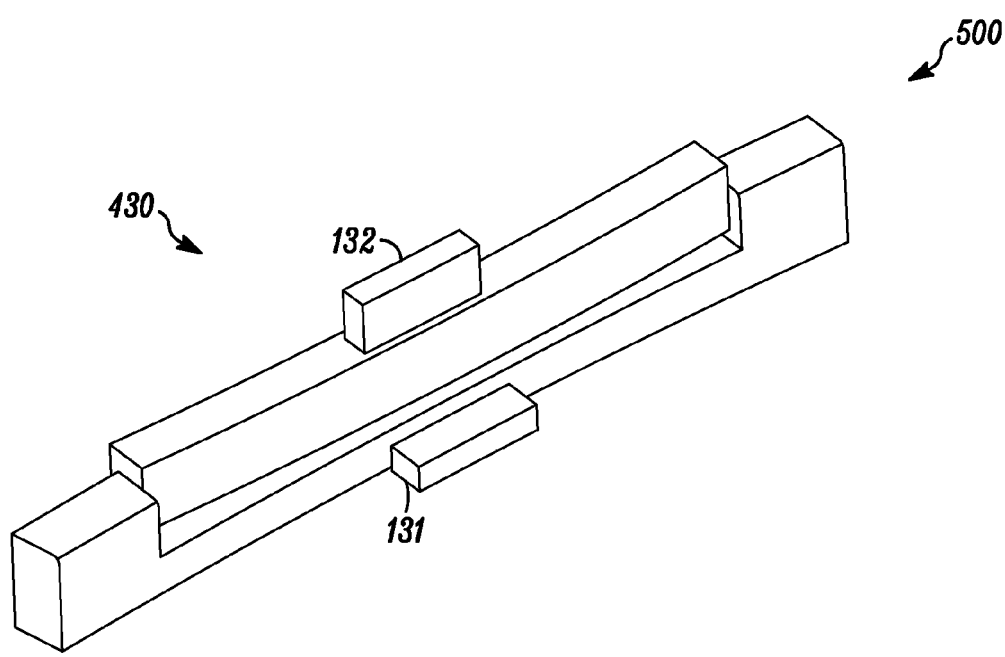
FIG. 5 is an example illustration of the coupling mechanism in FIG. 4 in a second orientation according to one embodiment.

FIG. 4 is an example illustration of a coupling mechanism 430, such as the coupling mechanism 130, in a first orientation 400 according to one embodiment. FIG. 5 is an example illustration of the coupling mechanism 430 in a second orientation 500 according to one embodiment. The coupling mechanism 430 can include the first coupling mechanism connector 131 and the second coupling mechanism connector 132 mechanically coupled to the first coupling mechanism connector 131. The coupling mechanism 430 can be a coffin clam hinge coupling mechanism that can operate in one orientation, such as the orientation 400, and can operate at or move through another orientation, such as the second orientation 500.

Figure 6:
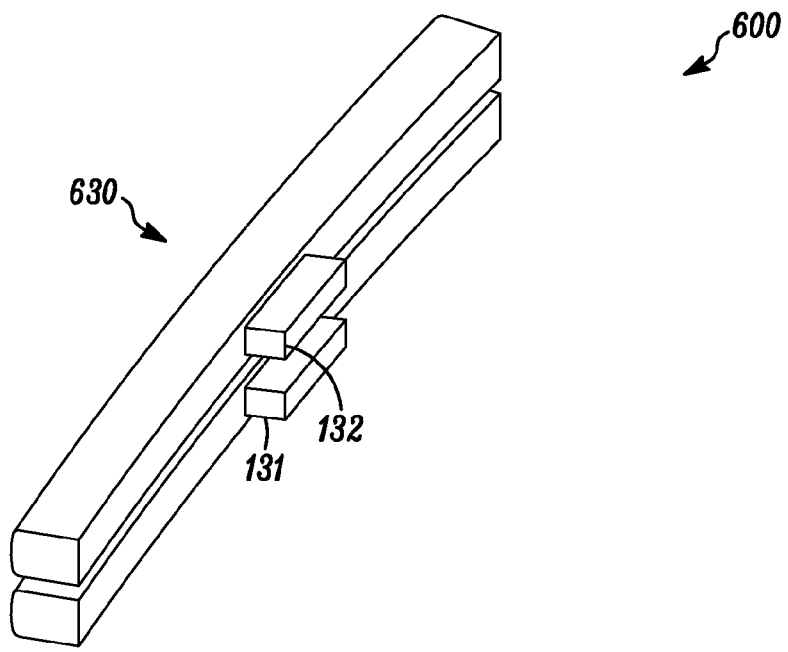
FIG. 6 is an example illustration of a coupling mechanism in one orientation according to one embodiment.
Figure 7:
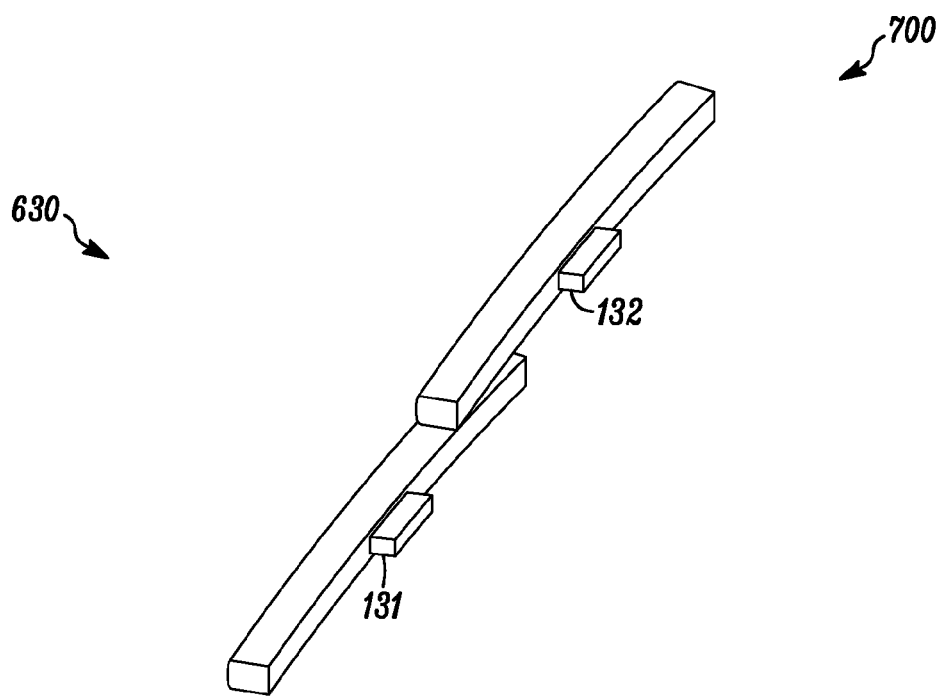
FIG. 7 is an example illustration of the coupling mechanism in FIG. 6 in a second orientation according to one embodiment.

FIG. 6 is an example illustration of a coupling mechanism 630, such as the coupling mechanism 130, in a first orientation 600 according to one embodiment. FIG. 7 is an example illustration of the coupling mechanism 630 in a second orientation 700 according to one embodiment. The coupling mechanism 630 can include the first coupling mechanism connector 131 and the second coupling mechanism connector 132 mechanically coupled to the first coupling mechanism connector 131. The coupling mechanism 630 can be a slider coupling mechanism that can operate in one orientation, such as the orientation 600, and can operate at or move through another orientation, such as the second orientation 700.

Figure 8:
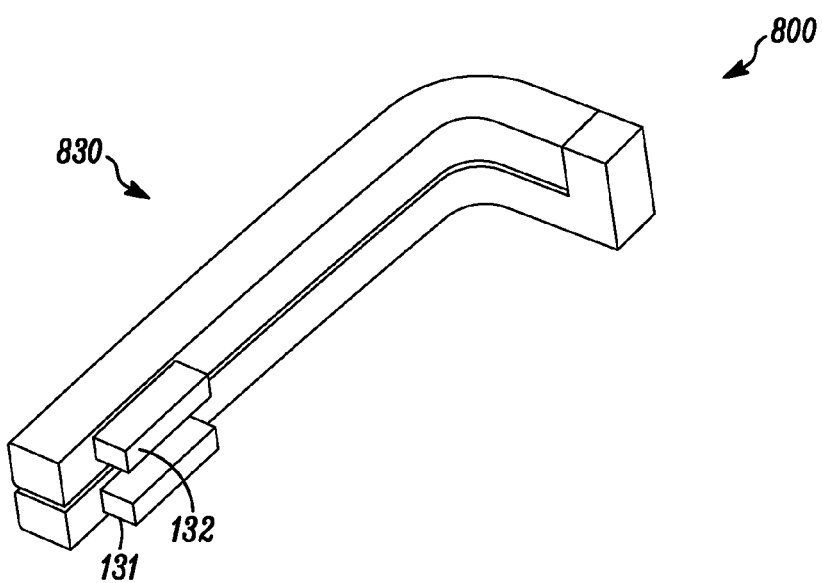
FIG. 8 is an example illustration of a coupling mechanism in one orientation according to one embodiment.
Figure 9:
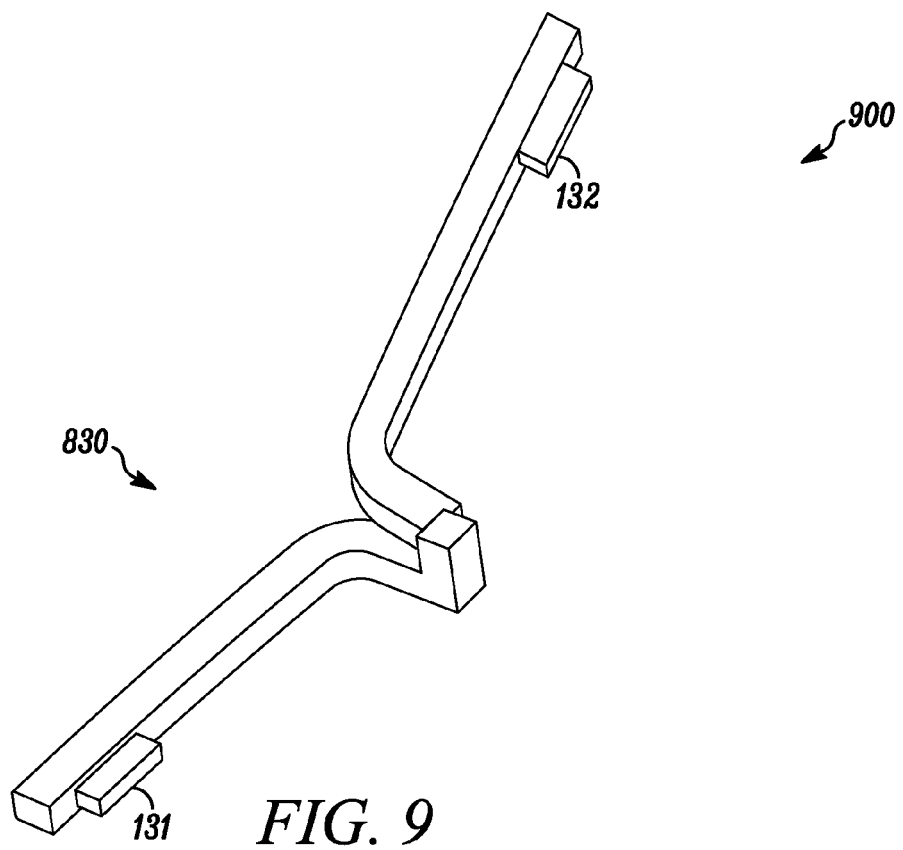
FIG. 9 is an example illustration of the coupling mechanism in FIG. 8 in a second orientation according to one embodiment.

FIG. 8 is an example illustration 800 of a coupling mechanism 830, such as the coupling mechanism 130, in a first orientation 800 according to one embodiment. FIG. 9 is an example illustration of the coupling mechanism 830 in a second orientation 900 according to one embodiment. The coupling mechanism 830 can include the first coupling mechanism connector 131 and the second coupling mechanism connector 132 mechanically coupled to the first coupling mechanism connector 131. The coupling mechanism 830 can be a clam hinge coupling mechanism that can operate in one orientation, such as the orientation 800, and can operate at or move through another orientation, such as the second orientation 900.

Some of the above embodiments can provide a hinge-configurable dual card portable communication device, such as a mobile phone, where one portion can be a portable communication device and the other portion can be connected to the first portion via a detachable and movable connector mechanism, such as the coupling mechanism 130. The other portion may be another portable communication device, may be a user interface, may be a feature card, or may be any other portion. Embodiments can provide for a sliding configuration, a clam configuration, a book configuration, a 360 degree rotation configuration, a back-to-back display configuration, a side-by-side double display configuration, a television mode with multiple angle configuration, a chopper rotation configuration, and/or any other configuration.

Figure 10:
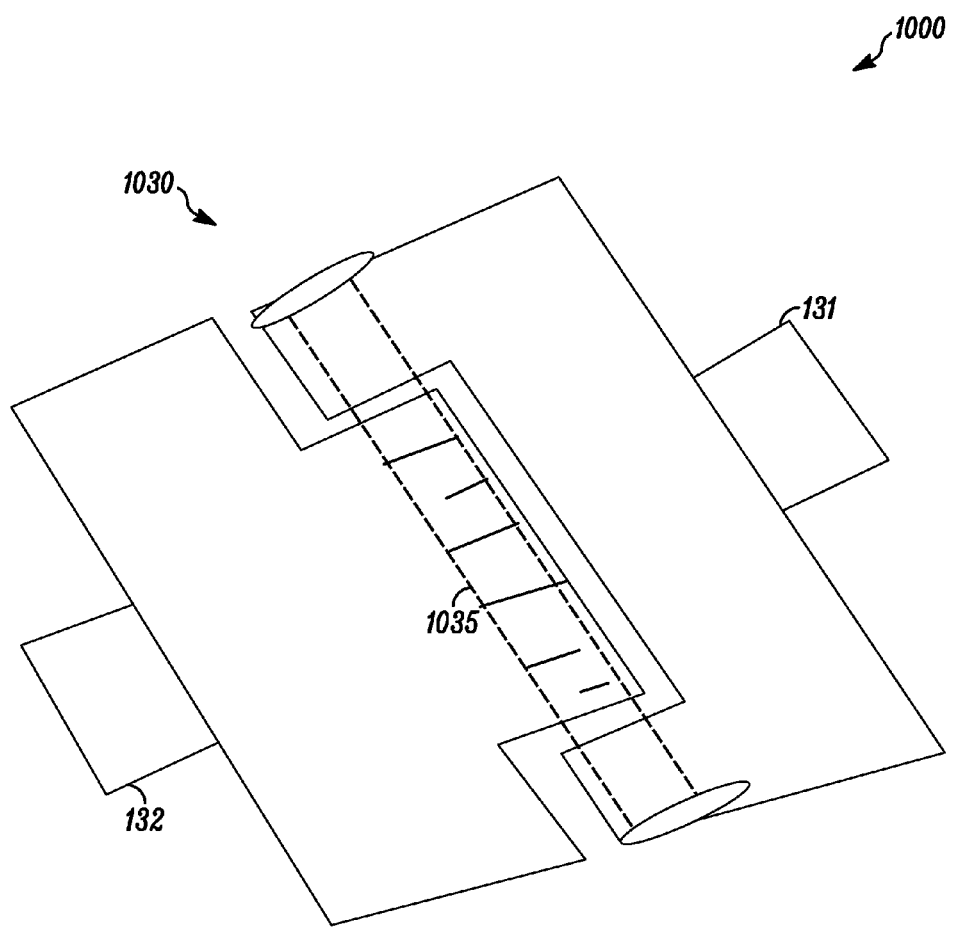
FIG. 10 is an example illustration of a coupling mechanism according to one embodiment.

FIG. 10 is an example illustration 1000 of a coupling mechanism 1030, such as the coupling mechanism 130, according to one embodiment. The coupling mechanism 1030 can include the first coupling mechanism connector 131 and the second coupling mechanism connector 132 mechanically coupled to the first coupling mechanism connector 131. The second coupling mechanism connector 132 can be a second coupling mechanism communication signal interface. For example, both the coupling mechanism connectors 131 and 132 each can be coupling mechanism communication signal interface, such as a Universal Serial Bus (USB) connector, an IEEE 1394 connector, a Small Computer System Interface (SCSI) connector, or any other electromechanical connector. The second coupling mechanism connector 132 can be configured to directly communicate with the first coupling mechanism connector 131 to enable electrical communications between a first portable communication device and a second portable communication device. For example, the coupling mechanism 1030 can include an electrical connection 1035. The electrical connection 1035 can be metal rings, a flex circuit, such as a flexible circuit board on Mylar, angular coded rings, or any other electrical connection. Also, the electrical connection 1035 can be a rotating connector, a headset jack-type connector, an angular encoded headset jack-type ring connector, or any other electromechanical connector. Furthermore, the electrical connection 1035 may be a pin the couples the coupling mechanism connectors 131 and 132. According to another embodiment, the coupling mechanism connectors 131 and 132 may be only mechanical connectors and a first portable communication device can communicate with a second portable communication device using wireless communications. Also, the coupling mechanism connectors 131 and 132 can be electromechanical connectors and a first portable communication device can communicate with a second portable communication device both electrically and wirelessly. A wireless interface can be enabled or disabled, for example, based on the second portable communication device user interface card type and based on whether there is a desire to communicate between the portable communication devices when separated.

Figure 11:
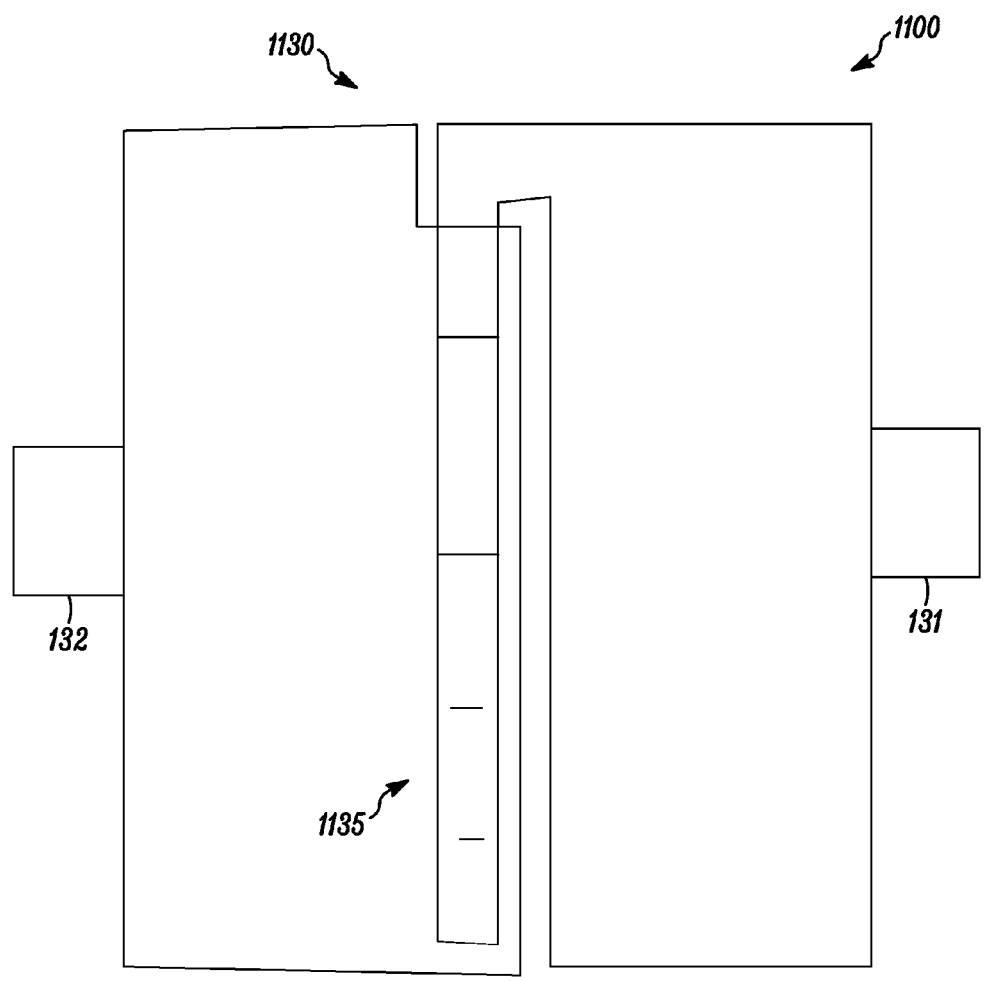
FIG. 11 is an example illustration of a coupling mechanism according to one embodiment.

FIG. 11 is an example illustration 1100 of a coupling mechanism 1130, such as the coupling mechanism 130, according to one embodiment. The coupling mechanism 1130 can include the first coupling mechanism connector 131 and the second coupling mechanism connector 132 mechanically coupled to the first coupling mechanism connector 131. The first coupling mechanism connector 131 can be a coupling mechanism communication signal interface. The second coupling mechanism connector 132 can be a second coupling mechanism communication signal interface configured to directly communicate with the first coupling mechanism connector 131 to enable electrical communications between a first portable communication device and a second portable communication device. For example, the coupling mechanism 1130 can include an electrical connection 1135. The electrical connection 1135 can be a rotating connector, a headset jack-type connector, an angular encoded headset jack-type ring connector, or any other electromechanical connector. For example, the electrical connection 1135 can be an electronic device connector with band and angle encoding as disclosed in U.S. Pat. No. 7,351,065, issued Apr. 1, 2008, which is commonly assigned with the present disclosure, and which is hereby incorporated by reference. As another example, second coupling mechanism connector 1130 can include active hardware that power regulates, power switches, data regulates, processes, or otherwise actively controls either portable communication device or can include passive hardware that passes signals between the portable communication devices.

Figure 12:
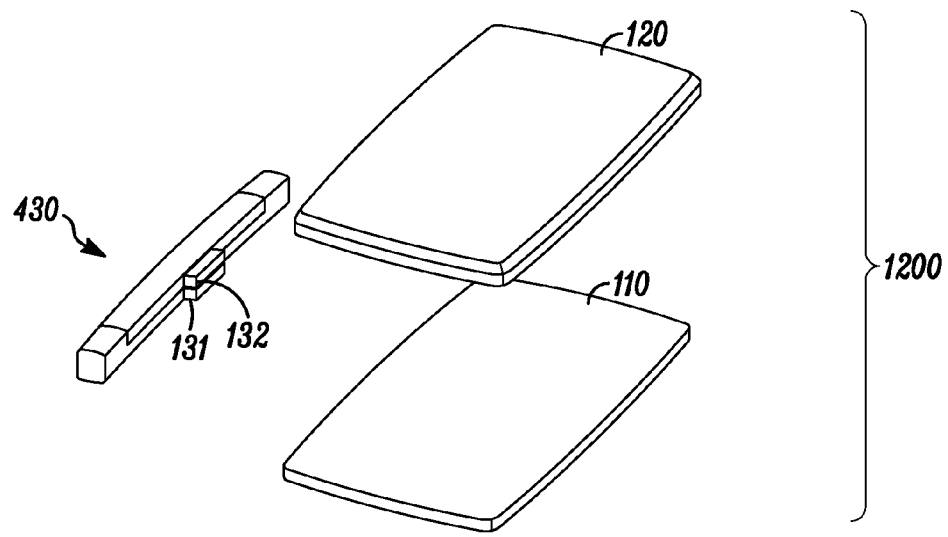
FIG. 12 is an example exploded view illustration of an apparatus according to one embodiment.
Figure 13:
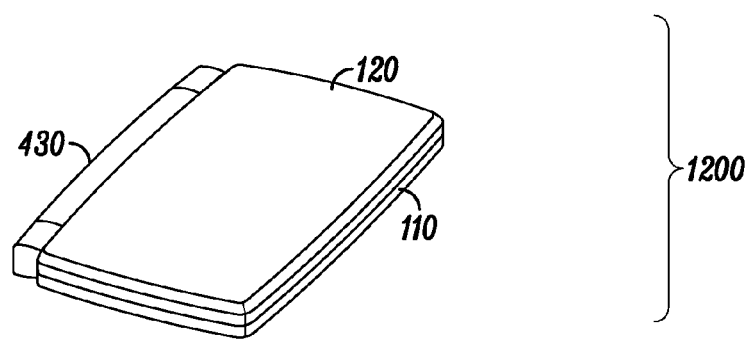
FIG. 13 is an example combined view illustration of the apparatus in FIG. 12 in one orientation according to one embodiment.
Figure 14:
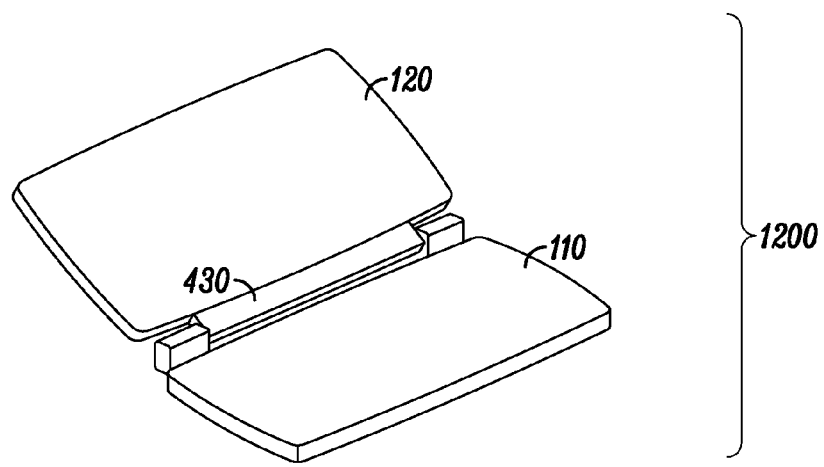
FIG. 14 is an example operational view of the apparatus in FIG. 12 in a second orientation according to one embodiment.

FIG. 12 is an example exploded view illustration of an apparatus 1200, such as the apparatus 100, according to one embodiment. FIG. 13 is an example combined view illustration of the apparatus 1200 in a closed position according to one embodiment. FIG. 14 is an example operational view of the apparatus 1200 in a television and/or open book position according to one embodiment. The apparatus 1200 can include the first portable communication device 110, the second portable communication device 120, and the coupling mechanism 430. The coupling mechanism 430 can include the first coupling mechanism connector 131 and the second coupling mechanism connector 132. Thus, the coupling mechanism 130 can be intended to be used for opening and closing the portable communication devices 110 and 120 in an overlapping manner.

Figure 15:
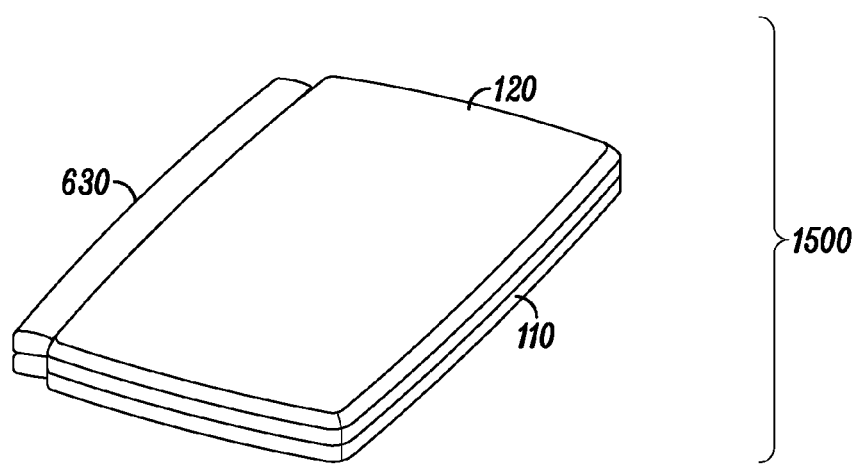
FIG. 15 is an example illustration of an apparatus in one orientation according to one embodiment.
Figure 16:
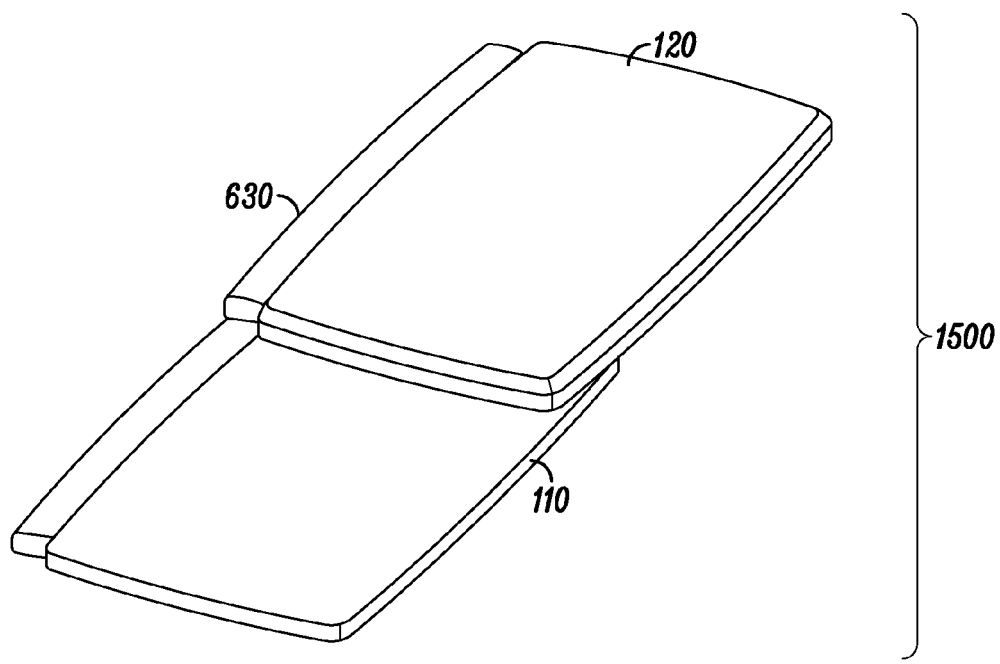
FIG. 16 is an example operational view of the apparatus in FIG. 15 in a second orientation according to one embodiment.

FIG. 15 is an example illustration of an apparatus 1500, such as the apparatus 100, in a slider closed position according to one embodiment. FIG. 16 is an example operational view of the apparatus 1500 in a slider open position according to one embodiment. The apparatus 1500 can include the first portable communication device 110, the second portable communication device 120, and the coupling mechanism 630. Thus, as above the coupling mechanism 130 can be intended to be used for opening and closing the portable communication devices 110 and 120 in an overlapping manner.

Figure 17:
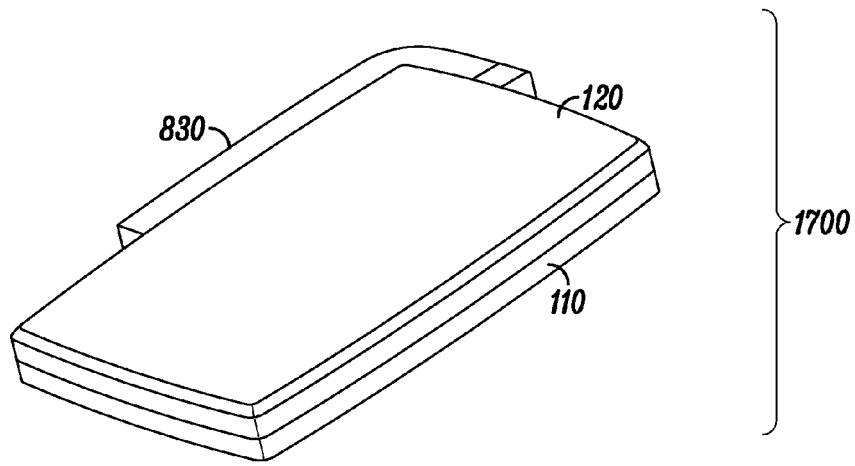
FIG. 17 is an example illustration of an apparatus in one orientation according to one embodiment.
Figure 18:
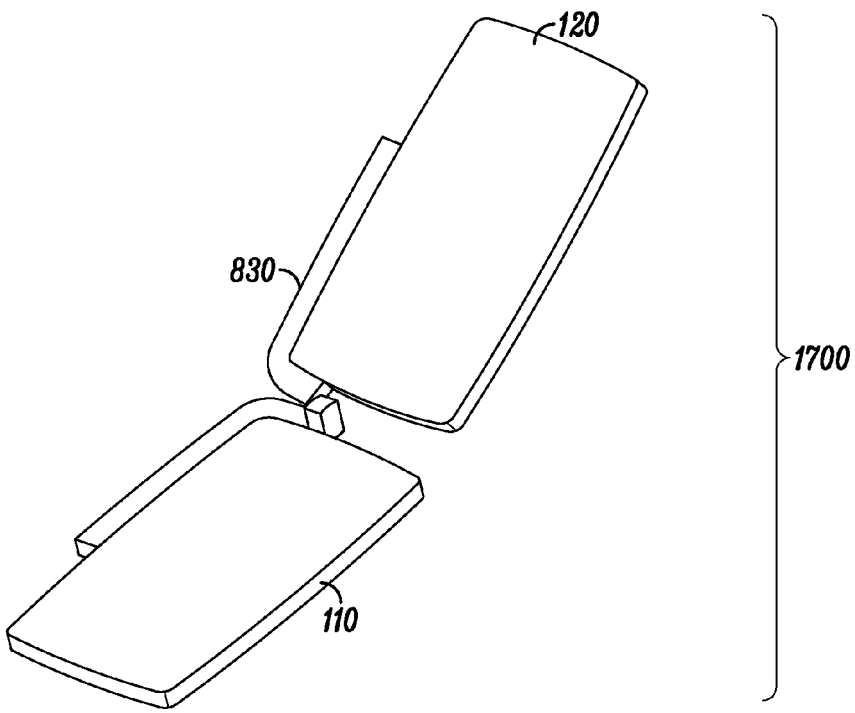
FIG. 18 is an example operational view of the apparatus in FIG. 17 in a second orientation according to one embodiment.

FIG. 17 is an example illustration of an apparatus 1700, such as the apparatus 100, in a clam closed position according to one embodiment. FIG. 18 is an example operational view of the apparatus 1700 in a clam open position according to one embodiment. The apparatus 1700 can include the first portable communication device 110, the second portable communication device 120, and the coupling mechanism 830.

Figure 19:
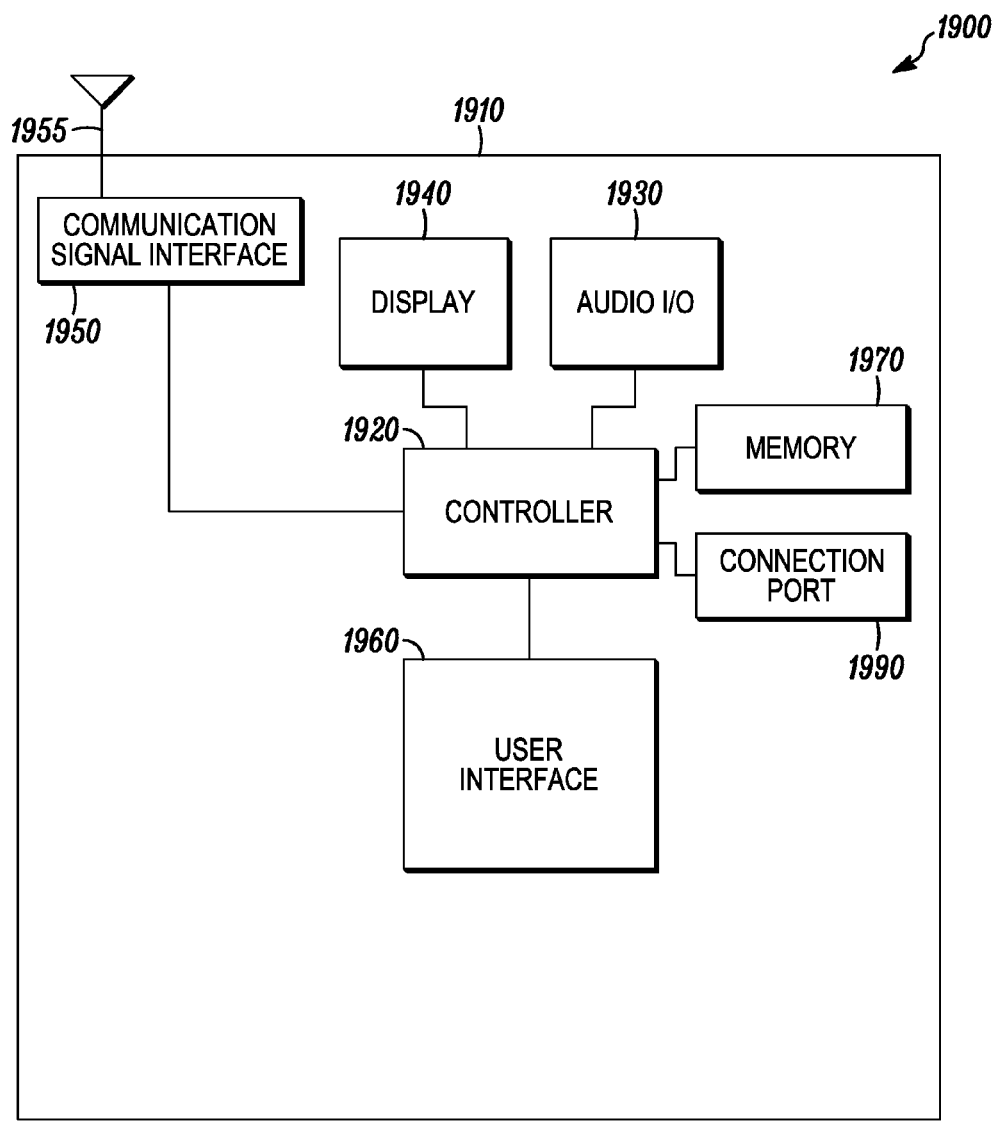
FIG. 19 is an exemplary block diagram of a portable communication device according to one embodiment.

FIG. 19 is an exemplary block diagram of a portable communication device 1900, such as the portable communication devices 110 and/or 120, according to one embodiment. The portable communication device 1900 can include a housing 1910, a controller 1920 located within the housing 1910, audio input and output circuitry 1930 coupled to the controller 1920, a display 1940 coupled to the controller 1920, at least one communication signal interface coupled to the controller 1920, a user interface 1960 coupled to the controller 1920, and a memory 1970 coupled to the controller 1920. The portable communication device 1900 can also include a connection port 1990.

The display 1940 can be a liquid crystal display (LCD), a light emitting diode (LED) display, a plasma display, a touch screen display, a projector, or any other means for displaying information. Other methods can be used to present information to a user, such as aurally through a speaker or kinesthetically through a vibrator. A first portable communication device can include a first display and a second portable communication device can include a second display. Both the first display and the second display can be active when the first portable communication device is coupled to the second portable communication device via a coupling mechanism The at least one communication signal interface 1950 can include or be a wireless transceiver that can include a transmitter and/or a receiver. The portable communication device 1900 can include an antenna 1955 coupled to the at least one communication signal interface 1950. The at least one communication signal interface 1950 can communicate wirelessly over a cellular communication network, Wi-Fi network, or global positioning system network (GPS). The at least one communication signal interface 1950 can also include a direct electrical connection communication signal interface, an infrared communication signal interface, an optical communication signal interface, a radio frequency communication signal interface, and/or other communication signal interfaces for communication with other devices.

The audio input and output circuitry 1930 can include a microphone, a speaker, a transducer, or any other audio input and output circuitry. The user interface 1960 can include a keypad, buttons, a touch pad, a joystick, an additional display, a touch screen display, or any other device useful for providing an interface between a user and an electronic device. The memory 1970 can include a random access memory, flash memory, a read only memory, an optical memory, a subscriber identity module memory, or any other memory that can be coupled to a portable communication device.

Figure 20:
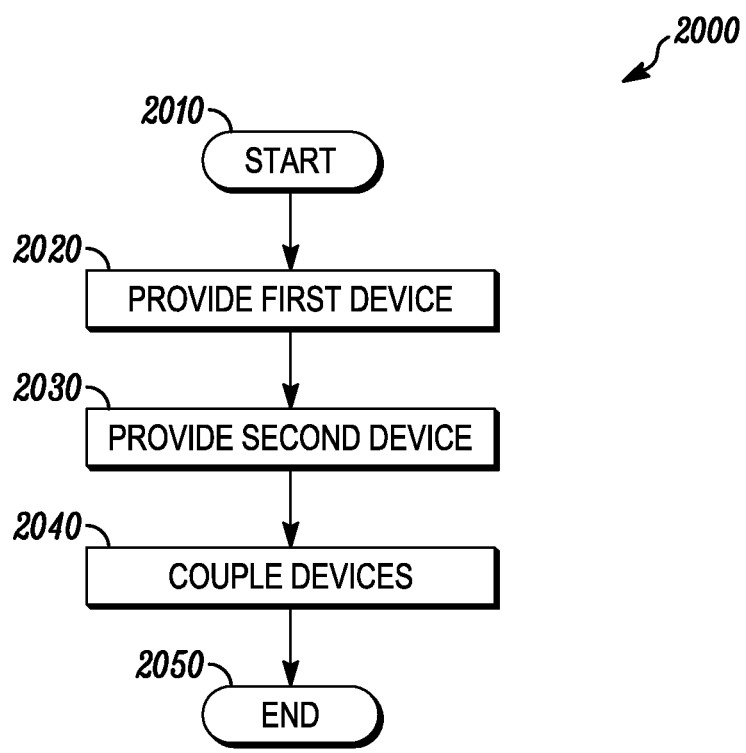
FIG. 20 illustrates a sample flowchart for an example method of coupling portable communication devices according to one embodiment.

FIG. 20 illustrates a sample flowchart 2000 illustrating a method of coupling portable communication devices, such as for the apparatus 100, according to one embodiment. At 2010, the flowchart can begin. At 2020, a first portable communication device including a first portable communication device connector can be provided. The first portable communication device can be a device including wireless communication circuitry. At 2030, a second portable communication device including a second portable communication device connector can be provided. The second portable communication device can be configured to communicate with the first portable communication device.

At 2040, coupling of the first portable communication device to the second portable communication device can be enabled using a detachable coupling mechanism. The detachable coupling mechanism can include a first coupling mechanism connector and a second coupling mechanism connector mechanically coupled to the first coupling mechanism connector. The second coupling mechanism connector can be movable relative to the first coupling mechanism connector. The first portable communication device connector can be detachably coupled to the first coupling mechanism connector. The second portable communication device connector can be detachably coupled to the second coupling mechanism connector. The first portable communication device can be adapted to be used independent from the second portable communication device. The second portable communication device can be configured to move relative to the first portable communication device when coupled to the coupling mechanism.

The second coupling mechanism connector can be rigidly mechanically coupled to the first coupling mechanism connector such that the second coupling mechanism connector can be configured to move in a substantially single plane relative to the first coupling mechanism connector. For example, the second coupling mechanism connector can rotate or slide relative to the first coupling mechanism connector. The second portable communication device can be a portable communication device user interface. The coupling mechanism can enable operation of the first portable communication device with different portable communication device user interfaces, such as the second portable communication device.

The first portable communication device can include a first portable communication device communication signal interface. The second portable communication device can include a second portable communication device signal interface configured to directly communicate with the first portable communication device communication signal interface using wireless communication. Alternately or also, the first coupling mechanism connector can include a first coupling mechanism communication signal interface. The second coupling mechanism connector can include a second coupling mechanism communication signal interface configured to directly communicate with the first coupling mechanism communication signal interface to enable electrical communications between the first portable communication device and the second portable communication device. At 2050, the flowchart 2000 can end.

According to some embodiments, all of the blocks of the flowchart 2000 are not necessary. Additionally, the flowchart 2000 or blocks of the flowchart 2000 may be performed numerous times, such as iteratively. For example, the flowchart 2000 may loop back from later blocks to earlier blocks. Furthermore, many of the blocks can be performed concurrently or in parallel processes.

The methods of this disclosure may be implemented on a programmed processor. However, the operations of the embodiments may also be implemented on non-transitory machine readable storage having stored thereon a computer program having a plurality of code sections that include the steps illustrated in FIG. 20, or a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
a first coupling mechanism providing a first form factor for the apparatus, the first coupling mechanism including:
a first coupling mechanism connector; and
a second coupling mechanism connector mechanically coupled to the first coupling mechanism connector, where the second coupling mechanism connector is movable relative to the first coupling mechanism connector;
a first portable communication device including a first portable communication device connector detachably coupled to the first coupling mechanism connector; and
a second portable communication device including a second portable communication device connector detachably coupled to the second coupling mechanism connector, the second portable communication device configured to communicate with the first portable communication device and move relative to the first portable communication device when coupled to the coupling mechanism,
wherein the first portable communication device is adapted to be used independent from the second portable communication device,
wherein the apparatus further comprises a second coupling mechanism interchangeable with the first coupling mechanism, the second coupling mechanism providing a second form factor for the apparatus different from the first form factor, the second coupling mechanism comprising:
a second first coupling mechanism connector, where the first portable communication device connector detachably couples to the second first coupling mechanism connector; and
a second second coupling mechanism connector mechanically coupled to the second first coupling mechanism connector, where the second second coupling mechanism connector moves relative to the second first coupling mechanism connector differently from movement between the first coupling mechanism connector and the second coupling mechanism connector, where the second portable communication device connector detachably couples to the second second coupling mechanism connector, and wherein the second portable communication device provides a user interface for the first portable communication device to access functions of the first portable communication device that are not accessible without the second portable communication device.

2. The apparatus according to claim 1, wherein the first portable communication device comprises a device including cellular communication circuitry.

3. The apparatus according to claim 1, wherein the first coupling mechanism comprises a first one of a hinge mechanism, a slider mechanism, and a rotation mechanism, wherein the second coupling mechanism comprises a second one of a hinge mechanism, a slider mechanism, and a rotation mechanism, wherein the second one of a hinge mechanism, a slider mechanism, and a rotation mechanism is different from the first one of a hinge mechanism, a slider mechanism, and a rotation mechanism.

4. The apparatus according to claim 1, wherein the second portable communication device comprises a portable communication device user interface, and wherein the first and second coupling mechanisms enable operation of the first portable communication device with different portable communication device user interfaces.

5. The apparatus according to claim 1, wherein the first portable communication device includes a first portable communication device communication signal interface, and wherein the second portable communication device includes a second portable communication device signal interface configured to wirelessly communicate with the first portable communication device communication signal interface.

6. The apparatus according to claim 1, wherein the first coupling mechanism connector includes a first coupling mechanism communication signal interface, and wherein the second coupling mechanism connector includes a second coupling mechanism communication signal interface configured to electronically communicate with the first coupling mechanism communication signal interface.

7. The apparatus according to claim 1, wherein the first portable communication device includes a first display, wherein the second portable communication device includes a second display, and wherein both the first display and the second display are active when the first portable communication device is coupled to the second portable communication device via the first coupling mechanism.

8. The apparatus according to claim 1, wherein the second portable communication device includes components that use resources of the first portable communication device when connected to the first portable communication device via the first coupling mechanism.

9. The apparatus according to claim 1, wherein the second portable communication device is powered by the first portable communication device when connected to the first portable communication device via the first coupling mechanism.

10. The apparatus according to claim 1, wherein the second portable communication device provides additional functionality for the first portable communication device when connected to the first portable communication device via the first coupling mechanism.

11. The apparatus according to claim 1, wherein the second portable communication device enables latent functionality of the first portable communication device when connected to the first portable communication device via the first coupling mechanism.

12. The apparatus according to claim 1, wherein the second coupling mechanism connector is mechanically movably coupled to the first coupling mechanism connector such that the second coupling mechanism connector is configured to move in a substantially single plane relative to the first coupling mechanism connector.

13. The apparatus according to claim 1, wherein the first coupling mechanism connector includes a first coupling mechanism optical communication signal interface, and wherein the second coupling mechanism connector includes a second coupling mechanism optical communication signal interface configured to optically communicate with the first coupling mechanism optical communication signal interface.

14. The apparatus according to claim 1, wherein the first coupling mechanism connector includes a first angle encoded ring coupling mechanism communication signal interface, wherein the second coupling mechanism connector includes a second angle encoded ring coupling mechanism communication signal interface configured to electronically communicate with the first angle encoded ring coupling mechanism communication signal interface, and wherein at least one connector of the first angle encoded ring coupling mechanism communication signal interface contacts at least one connector of the second angle encoded ring coupling mechanism communication signal interface depending on the position of the second portable communication device relative to the first portable communication device.

15. The apparatus according to claim 1, wherein the second portable communication device is configured to communicate with the first portable communication device via the second coupling mechanism connector when connected to the second coupling mechanism connector, and wherein the second portable communication device is configured to communicate with the first portable communication device wirelessly when detached from the second coupling mechanism connector.

16. The apparatus according to claim 1, wherein the first portable communication device includes a first portable communication device communication signal interface, and wherein the second portable communication device includes a second portable communication device signal interface configured to wirelessly communicate with the first portable communication device communication signal interface using short range wireless communication signals.

17. The apparatus according to claim 1, wherein the second coupling mechanism connector comprises a universal serial bus connector.

18. A method comprising:

providing a first portable communication device including a first portable communication device connector;

providing a second portable communication device including a second portable communication device connector, the second portable communication device configured to communicate with the first portable communication device;

enabling coupling of the first portable communication device to the second portable communication device using a first detachable coupling mechanism providing a first form factor for the apparatus, the first detachable coupling mechanism including a first coupling mechanism connector and a second coupling mechanism connector mechanically coupled to the first coupling mechanism connector, where the second coupling mechanism connector is movable relative to the first coupling mechanism connector, where the first portable communication device connector is detachably coupled to the first coupling mechanism connector, where the second portable communication device connector is detachably coupled to the second coupling mechanism connector, where the first portable communication device is adapted to be used independent from the second portable communication device, and where the second portable communication device is configured to move relative to the first portable communication device when coupled to the coupling mechanism; and enabling coupling of the first portable communication device to the second portable communication device using a second detachable coupling mechanism interchangeable with the first detachable coupling mechanism, the second detachable coupling mechanism providing a second form factor for the apparatus different from the first form factor, the second detachable coupling mechanism including a second first coupling mechanism connector and a second second coupling mechanism connector mechanically coupled to the second first coupling mechanism connector, where the second second coupling mechanism connector moves relative to the second first coupling mechanism connector differently from movement between the first coupling mechanism connector and the second coupling mechanism connector, where the first portable communication device connector detachably couples to the second first coupling mechanism connector, and where the second portable communication device connector detachably couples to the second second coupling mechanism connector, wherein the second portable communication device provides a user interface for the first portable communication device to access functions of the first portable communication device that are not accessible without the second portable communication device.

19. The method according to claim 18, wherein the second coupling mechanism connector is rigidly mechanically coupled to the first coupling mechanism connector such that the second coupling mechanism connector is configured to move in a substantially single plane relative to the first coupling mechanism connector.

20. The method according to claim 18,
wherein the second portable communication device comprises a portable communication device user interface, and
wherein the first detachable coupling mechanism enables operation of the first portable communication device with different portable communication device user interfaces.

21. The method according to claim 18, wherein the first portable communication device comprises a device including cellular communication circuitry.

22. The method according to claim 18,
wherein the first portable communication device includes a first portable communication device communication signal interface, and
wherein the second portable communication device includes a second portable communication device signal interface configured to directly communicate with the first portable communication device communication signal interface using wireless communication.

23. The method according to claim 18,
wherein the first coupling mechanism connector includes a first coupling mechanism communication signal interface, and
wherein the second coupling mechanism connector includes a second coupling mechanism communication signal interface configured to directly communicate with the first coupling mechanism communication signal interface to enable electrical communications between the first portable communication device and the second portable communication device.

24. A system comprising:
a first coupling mechanism providing a first form factor for the system, the first coupling mechanism including:
 a first first coupling mechanism connector; and
 a first second coupling mechanism connector movably mechanically coupled to the first first coupling mechanism connector, where the first second coupling mechanism connector is configured to move in a substantially single plane relative to the first first coupling mechanism connector;
a portable communication device including a first portable communication device connector detachably coupled to the first first coupling mechanism connector; and
a portable communication user interface device including a portable communication device user interface connector detachably coupled to the first second coupling mechanism connector, the portable communication user interface device configured to communicate with the portable communication device and move relative to the portable communication device when coupled to the first coupling mechanism,
wherein the portable communication device is adapted to be used independent from the portable communication user interface device,
wherein the coupling mechanism enables operation of first portable communication device with different portable communication device user interface devices, and
wherein the system further comprises a second coupling mechanism interchangeable with the first coupling mechanism, the second coupling mechanism providing a second form factor for the system different from the first form factor, the second coupling mechanism comprising:
 a second first coupling mechanism connector, where the first portable communication device connector detachably couples to the second first coupling mechanism connector; and
 a second second coupling mechanism connector mechanically coupled to the second first coupling mechanism connector, where the second second coupling mechanism connector moves relative to the second first coupling mechanism connector differently from movement between the first first coupling mechanism connector and the first second coupling mechanism connector, where the second portable communication device connector detachably couples to the second second coupling mechanism connector, and wherein the portable communication user interface device provides a user interface for the portable communication device to access functions of the portable communication device that are not accessible without the portable communication user interface device.

25. The system according to claim 24, wherein the first coupling mechanism opens and closes the portable communication device relative to the portable communication device user interface in an overlapping manner.

* * * * *